July 27, 1926.

H. J. RUCH

STEAM PLATEN

Filed Nov. 20, 1925

1,594,120

Inventor:
Herman J. Ruch,
By Murray O. Boyer
Attorney.

Patented July 27, 1926.

1,594,120

UNITED STATES PATENT OFFICE.

HERMAN J. RUCH, OF WOODBURY HEIGHTS, NEW JERSEY, ASSIGNOR TO SOUTHWARK FOUNDRY & MACHINE COMPANY, OF PHILADELPHIA, PENNSYLVANIA, A CORPORATION OF PENNSYLVANIA.

STEAM PLATEN.

Application filed November 20, 1925. Serial No. 70,403.

My invention relates to steam plates or, as they are called, "platens," such as are employed with power presses acting upon plastic material requiring heating or cooling during a pressing operation, and particularly in the curing of rubber or composition goods, or for other purposes where a heated plate is required; such plates or platens having internal passages for the circulation of steam, water, or other fluid media designed to effect the heating or, in some instances, the cooling of the plate for the desired operation in connection with the plastic material undergoing shaping under pressure or for other purposes. Provision is made for connecting suitable pipes to such plates or platens for the introduction, circulation and withdrawal of such heating or cooling media.

In order that such heating or cooling media, whether liquid or fluid, may be circulated continuously throughout the whole extent of the plate or platen, the several passages therein are in communication with each other and provide a continuous conduit between the inlet and outlet connections.

The present invention comprises a plate or platen having cross passages drilled across the plate or platen usually in one relative direction and at substantially right angles to the sides or marginal edges of such plate or platen; such passages being disposed relatively close together and approximately paralleling each other, with short passages diagonally disposed and arranged in pairs between pairs of the approximately paralleling cross passages; said diagonal passages extending from the open ends of said cross passages on converging axes and opening into each other relatively close and adjacent to the sides or marginal edges of the plate or platen and arranged on opposite sides of the plate or platen between alternate pairs of such approximately paralleling cross passages, so that a continuous conduit following a circuitous path for the circulation of temperature controlling media, usually steam, is provided.

These and other features of my invention are more fully described hereinafter; reference being had to the accompanying drawings, in which.

Figure 1:
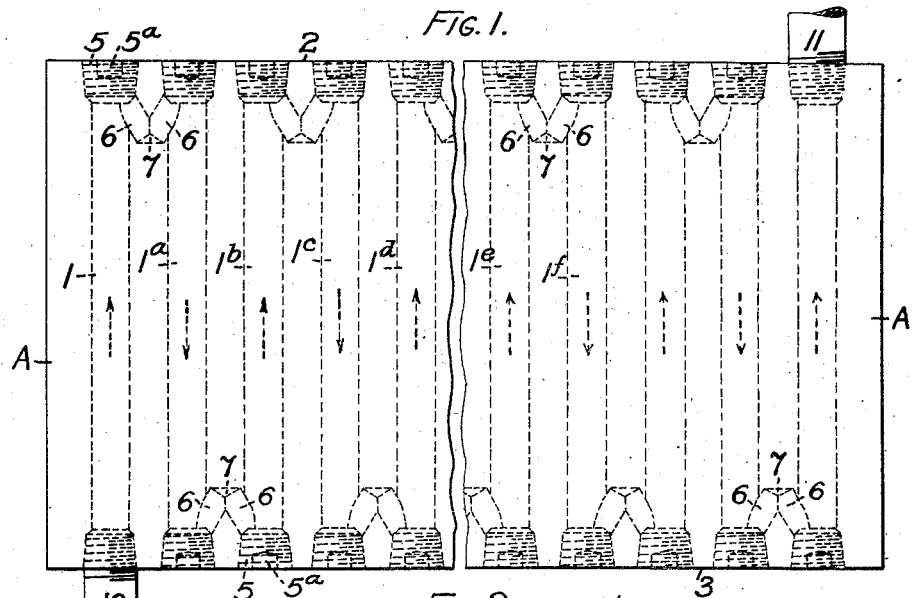
Figure 1, is a plan view of one form of heating plate within the scope of my invention; the cross passages and the converging diagonal connecting passages forming the continuous conduit being shown by dotted lines.

The plate or platen indicated at A, Fig. 1, is of the same general type as that illustrated in the patent of Richard W. Dinzl, No. 1,549,464, dated Aug. 11, 1925, and my improvements, while not limited thereto, are particularly applicable in the preparation of these relatively thin plates or platens, especially when of large dimensions lengthwise and where it is impossible to drill passages in one direction with respect to such plates, that is to say, longitudinally of the same when of great length.

In producing my improved plate or platen, a steel plate, such as indicated at A, is formed in the usual manner; such plate or platen being usually rectangular in contour and of uniform thickness, and of a dimension permitting the drilling of cross passages in one direction and connections therefor to form a continuous conduit for the circulation of temperature controlling media.

In the drawings, the cross passages of the plate or platen A are indicated at $1, 1^a, 1^b, 1^c$, et seq., and preferably extend from side to side of said plate or platen, that is to say, from one margin or edge 2, to the opposite margin or edge 3.

Each of these cross passages has its marginal opening subsequently enlarged and threaded, as indicated at 4, for the reception of a screw plug, indicated at 5; such plugs being socketed at $5^a$ for the application of a suitable noncircular tool to turn the same into or out of its socket; such plugs being removable for the purpose of cleaning the passages or for any other reason.

In order to provide a continuous conduit within the body of the plate or platen, it is necessary to connect the cross passages, 1, $1^a, 1^b, 1^c$, et seq., preferably adjacent to the marginal edges of the plate or platen; alternate pairs of such cross passages being connected at opposite sides of the plate or platen, and to provide these connections diagonal passages 6 are drilled in the plate or platen from the marginal edges of the same at converging angles.

These converging diagonal connecting passages 6 are formed in the plate or platen after the enlarged recesses have been made in the ends of the cross passages, but preferably before said recesses are threaded for the reception of the screw plugs 5.

Figure 2:
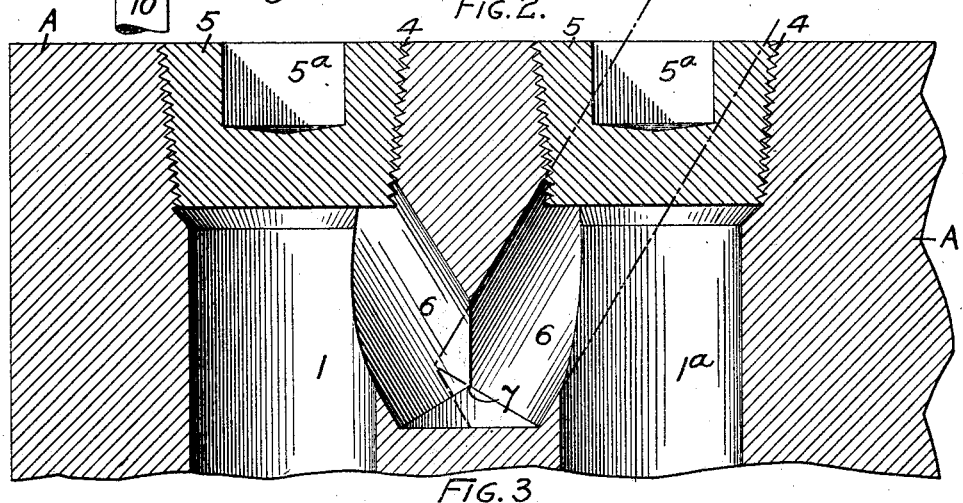
Fig. 2, is an enlarged sectional plan view of a portion of the structure shown in Fig. 1, clearly illustrating the improved features forming the subject of my invention.
Figure 3:
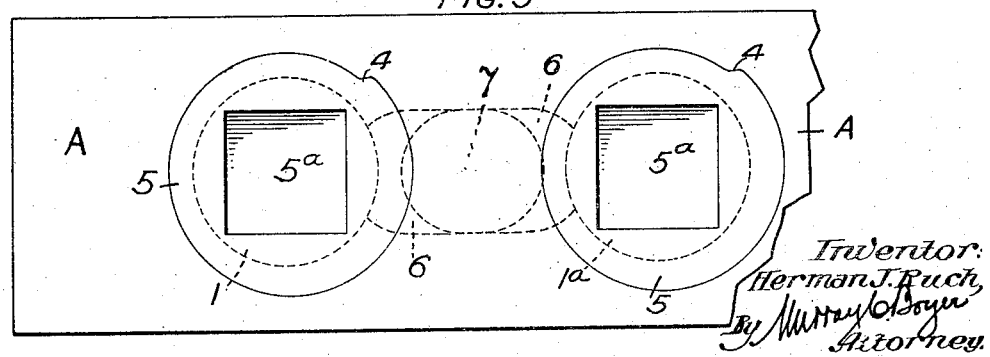
Fig. 3, is an end elevation or edge view of that portion of the plate shown in Fig. 2.

For this purpose, holes are drilled in two directions on converging axes from the roots of adjacent pairs of recesses formed in the ends of the cross passages and at angles of approximately 60° to the sides or marginal edges of the plate or platen, as clearly indicated in the drawings; the position of the drilling tool, whereby said converging passages 6 are produced, being indicated by broken lines in Fig. 2. These holes join at the point 7 and together form a communicating passage between pairs of adjacent cross passages alternately, at opposite ends of said pairs of passages, throughout the extent of the plate or platen and adjacent to the sides or marginal edges thereof.

After the diagonal converging passages 6 have been formed, the enlarged recesses at the ends of the cross passages may be threaded in the usual way and then the screw plugs 5 are applied to close the same. When this has been done, the finished plate or platen is provided with a continuous conduit or passage made up of the cross passages 1, 1$^a$, 1$^b$, 1$^c$, et seq., and the converging diagonal passages 6, disposed between alternate pairs of such cross passages at opposite ends of the same and adjacent to the marginal edges of the plate or platen, for the continuous circulation of heating or cooling media.

For the purpose of circulating the desired heating or cooling media, the cross passages at the ends of the plate or platen may be connected with the pipes 10 and 11, respectively, in communication with a suitable source of heating or cooling media, as the case may be.

I claim:

1. A heating platen comprising a thin-walled metal plate having approximately parallel cross passages in relatively close arrangement, with certain of said passages extending to at least one edge of the platen, and pairs of short diagonal connecting passages intermediate pairs of such cross passages and disposed alternately at opposite ends of the latter; said diagonal passages extending from the open end of each one of a pair of such cross passages and converging at a common meeting point, in combination with means for closing the open ends of said cross passages.

2. A heating platen comprising a thin-walled metal plate having approximately parallel cross passages in relatively close arrangement extending from edge to edge of the same, and pairs of short diagonal passages connecting pairs of said cross passages alternately at opposite ends of the latter; said diagonal passages extending from the open end of each one of a pair of cross passages to be connected and converging at a common meeting point, in combination with means for closing the open ends of said cross passages.

3. A heating platen comprising a thin-walled metal plate having approximately parallel cross passages in relatively close arrangement, and pairs of short converging passages intermediate pairs of such cross passages for the purpose of connecting said cross passages alternately at opposite ends of the same; said converging passages extending from the open end of each one of a pair of such cross passages, in combination with screw plugs fitting the ends of such cross passages and serving as closures for the same.

4. A heating platen comprising a thin-walled metal plate having approximately parallel cross passages in relatively close arrangement, and pairs of short diagonal converging passages intermediate pairs of such cross passages for the purpose of connecting said cross passages; said diagonal passages extending from the open end of each one of a pair of cross passages to be connected, in combination with screw plugs fitting the ends of such cross passages and serving as closures for the same.

5. A thin-walled metal plate having a continuous conduit for the circulation of a temperature controlling medium; said conduit being made up of a series of relatively closely set approximately parallel cross passages and pairs of short converging passages disposed at the marginal edges of the platen and connecting pairs of such cross passages; said diagonal converging passages extending only from the open ends of pairs of such cross passages to a common meeting point within the body of the plate and arranged between pairs of adjacent cross passages.

6. A thin-walled metal plate having a continuous conduit for the circulation of a temperature controlling medium; said conduit being made up of a series of relatively closely set approximately parallel cross passages and pairs of short converging passages disposed at the marginal edges of the platen and connecting pairs of such cross passages; said diagonal converging passages extending only from the open ends of pairs of such cross passages to a common meeting point within the body of the plate and arranged between pairs of adjacent cross passages alternately at opposite sides or edges of the platen, and removable means closing the ends of said cross passages.

7. A heating platen comprising a thin-walled metal plate having a continuous conduit for the circulation of a heating medium; said conduit being made up of a series of closely set approximately parallel cross passages and pairs of short passages converging inwardly and disposed at the marginal edges of the platen and connecting pairs of such cross passages alternately at opposite sides or edges of the platen, and removable screw plugs closing the ends of said cross passages.

8. A thin-walled metal plate having a continuous conduit for the circulation of a temperature controlling medium; said conduit being made up of a series of relatively closely set approximately parallel cross passages and pairs of short diagonal passages disposed at the marginal edges of the platen and converging within the body of the same; said diagonal passages connecting pairs of such cross passages alternately at opposite sides or edges of the platen.

9. A temperature controlling platen comprising a thin-walled metal plate having approximately parallel cross passages in relatively close arrangement connected by pairs of short diagonal passages converging toward the body of the plate and disposed between pairs of such cross passages.

10. A temperature controlling platen comprising a thin-walled metal plate having approximately parallel cross passages in relatively close arrangement extending from edge to edge of the same, and connected by pairs of short diagonal passages converging toward the body of the plate and disposed between pairs of said cross passages alternately at opposite ends of the latter, in combination with detachable means for closing the open ends of said cross passages.

In witness whereof I have signed this specification.

HERMAN J. RUCH.